US011087012B2

(12) United States Patent
Waldron et al.

(10) Patent No.: US 11,087,012 B2
(45) Date of Patent: Aug. 10, 2021

(54) DATA PROTECTION SYSTEM AND METHOD

(71) Applicant: Cibecs International Ltd, Port Louis (MU)

(72) Inventors: Cameron Ian Waldron, Port Louis (MU); Neal Robert Dewing, Port Louis (MU)

(73) Assignee: Cibecs International Ltd., Port Louis (MU)

( * ) Notice: Subject to any disclaimer, the term of this patent is extended or adjusted under 35 U.S.C. 154(b) by 291 days.

(21) Appl. No.: 16/166,420

(22) Filed: Oct. 22, 2018

(65) Prior Publication Data
US 2020/0125754 A1    Apr. 23, 2020

(51) Int. Cl.
  *G06F 21/62*    (2013.01)
  *H04L 9/08*    (2006.01)
  *H04L 9/14*    (2006.01)

(52) U.S. Cl.
  CPC ........ *G06F 21/6218* (2013.01); *H04L 9/0861* (2013.01); *H04L 9/0894* (2013.01); *H04L 9/14* (2013.01)

(58) Field of Classification Search
  CPC .. G06F 21/6218; H04L 9/0861; H04L 9/0894
  See application file for complete search history.

(56) References Cited

U.S. PATENT DOCUMENTS 9,906,361 B1    2/2018 Perlman et al.
2006/0291664 A1  12/2006 Suarez et al.
2014/0019753 A1   1/2014 Lowry et al.
2014/0050317 A1   2/2014 Sabin
2016/0006707 A1   1/2016 Ying et al.
(Continued)

FOREIGN PATENT DOCUMENTS

CN    102722671 A    10/2012
CN    104954136 A     9/2015
CN    106254069 A    12/2016
(Continued)

OTHER PUBLICATIONS en.wikipedia.org, Wikipedia: "Garlic routing," (2018) pp. 1-1. Retrieved from the Internet on Aug. 3, 2018: https://en.wikipedia.org/wiki/Garlic_routing.
(Continued)

*Primary Examiner* — Dao Q Ho
(74) *Attorney, Agent, or Firm* — Marshall, Gerstein & Borun LLP

(57) ABSTRACT

There is disclosed a data protection system which comprises a backend server for providing a secure data storage facility to a network, the network being managed by an administrator. The system includes at least one key controller hosted on the network, and a hierarchy of cryptographic keys for cryptographically protecting data of the network. The hierarchy of keys are distributed between the network, the key controller and the backend server. The hierarchy of keys comprises first and second master keys Ax, Cx that are associated with the administrator and the key controller respectively. One or more derived keys are derived from the first and second master keys. At least one of the first and second master keys are kept resident on the network and at least one of the derived keys are kept resident on the backend server.

16 Claims, 11 Drawing Sheets

(56) References Cited

U.S. PATENT DOCUMENTS

2018/0150649 A1　5/2018　O'Hare et al.

FOREIGN PATENT DOCUMENTS

| CN | 107196920 A | 9/2017 |
| WO | WO-2010/077670 A1 | 7/2010 |
| WO | WO-2017/129184 A1 | 8/2017 |
| WO | WO-2018/009612 A1 | 1/2018 |
| WO | WO-2018/068133 A1 | 4/2018 |

OTHER PUBLICATIONS en.wikipedia.org, Wikipedia: "Onion routing," (2018) pp. 1-4. Retrieved from the Internet on Aug. 3, 2018: https://en.wikipedia.org/wiki/Onion_routing.

DATA PROTECTION SYSTEM AND METHOD

FIELD OF THE INVENTION

This invention relates to data protection. More particularly, but not exclusively, this invention relates to cloud-based data protection.

BACKGROUND TO THE INVENTION

The field of data security has grown significantly in importance during recent times. Due to increasing reliance on computer systems, the Internet and wireless networks, potential threats to data have escalated, especially with the advent of smart devices and the Internet of Things.

Commonly used data protection systems have attempted to address problems with data security with varying degrees of success. One such system is the so-called third-party escrow system where encryption keys are stored for a customer by a third party, whereas the customer's data is stored by a vendor. The customer's data is hence protected by authentication and authorization. However, third-party escrow systems suffer from low privacy, because government agencies or unscrupulous parties could compel the third party to release the keys and/or may compel the vendor to release the encrypted data of the customer.

Another known system provides a key management server that is owned by the customer, whereby all the encryption keys are stored on the customer's premises. This may increase privacy, but also results in significantly higher customer management overheads. With key management servers, the customer needs a local server to be managed, backed up and the customer also needs to have a good disaster recovery (DR) strategy in place. Customer managed key management servers are prone to so-called customer lockouts, whereby failure to correctly manage or backup the key management server could result in the loss of all encrypted data which of course may also lead to significant financial losses and other problems for the customer. Another problem with locally managed key management servers is that data security can only be as good as that of the customer's network, and the data security may be dependent on the diligence (or lack thereof) with which an administrator of the customer's network manages the key management server.

Keys are also sometimes stored along with the customer's data at a vendor. This also has the disadvantage of low privacy, because the unscrupulous parties or government agencies could compel the vendor to release (and decrypt) the customer's data. These systems are relatively insecure because anyone with access to the cipher-text also has access to the keys and can decrypt the data. The customer's data is ultimately only protected by authorisation when these systems are employed.

Other systems provide for keys to be held by customers or users themselves. These systems provide better privacy since only the customer or users have access to the encryption keys. However, these systems also suffer from high customer management overheads and users will sometimes require administrator intervention related to the keys. These systems have a high risk of customer lockout because users often forget passwords. Requiring users or even customers to retain and manage keys very often results in data losses due to bad management of keys or due to carelessness.

There is accordingly scope to address the aforementioned problems and deficiencies.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a data protection system comprising:

a backend server for providing a secure data storage facility to a network, the network being managed by an administrator utilising an administrator computing device connected to the network;

at least one key controller hosted on the network; and a hierarchy of cryptographic keys for cryptographically protecting data of the network and which hierarchy of keys are distributed between the network, the key controller and the backend server, the hierarchy of keys comprising a first master key that is associated with the administrator and a second master key that is associated with the key controller and one or more derived keys that are derived from the first and second master keys, wherein at least one of the first and second master keys are kept resident on the network and at least one of the derived keys are kept resident on the backend server, thereby inhibiting the backend server from obtaining access to plaintext data and plaintext master keys of the network.

Further features provide for the first master key to be a password selected by the administrator; for the second master key to be generated by the key controller; and for the hierarchy of cryptographic keys to be distributed between the administrator computing device, the key controller and the backend server.

Still further features provide for the hierarchy of keys to comprise a plurality of encryption layers that are applied to encrypt the data of the network; for the secure data storage facility to be in the form of a cloud-based or remote database associated with the backend server; and for encrypted data of the network to be stored in the remote database.

Yet further features provide for a local database to be associated with the network; for the first and/or second master keys to be stored in the local database of the network; and for the network to be provided with exclusive access to the first and/or second master keys in plaintext form.

Further features provide for at least one of the one or more derived keys to be stored in the remote database of the backend server.

Still further features provide for the first and/or second master keys to be generated on the computing device of the administrator of the network; for the first and/or second master keys to be enduring, persistent, non-transient or non-ephemeral; and for the data of the network to be persistent or enduring data.

Yet further features provide for a plurality of user domains to be provided on the network; for a plurality of user applications of a plurality of users to be provided in communication with the key controller to enable the users to view plaintext data from the remote database by decrypting the data using the first and second master keys.

Further features provide for the first and second master keys to provide multi-factor protection, whereby the data of the network is stored in the remote database in a cryptographically protected form, utilising the plurality of encryption layers, thereby requiring a would-be attacker to breach at least the first and second master keys simultaneously in order to hack or breach the data protection system; and for the multi-factor protection to be in the form of two-factor protection or key-encryption-key safety.

Still further features provide for the key controller to be in the form of a software service installed on the network; for the key controller to provide a gatekeeper functionality whereby the key controller automatically manages encryption and decryption of data, which may limit a responsibility of the administrator to only manage a password selected by the administrator.

In accordance with another aspect of the invention there is provided a computer-implemented method for protecting data, the method comprising:

providing a backend server for providing a secure data storage facility to a network, the network being managed by an administrator utilising an administrator computing device connected to the network;

providing at least one key controller to be hosted on the network; and protecting data of the network with a hierarchy of cryptographic keys that are distributed between the network, the key controller and the backend server, the hierarchy of keys comprising a first master key that is associated with the administrator and a second master key that is associated with the key controller and one or more derived keys that are derived from the first and second master keys, wherein at least one of the first and second master keys are kept resident on the network and at least one of the derived keys are kept resident on the backend server, thereby inhibiting the backend server from obtaining access to plaintext data and plaintext master keys of the network.

Further features provide for the first master key to be a password selected by the administrator; and for the method to include the step of generating the second master key with the key controller.

Still further features provide for the step of protecting data of the network with the hierarchy of keys to comprise applying a plurality of encryption layers to encrypt the data of the network; and for the method to include the step of storing encrypted data of the network in a remote database associated with the backend server.

Yet further features provide for a local database to be associated with the network; and for the method to include storing at least one of the first and second master keys in the local database of the network.

A further feature provides for the method to include providing the network with exclusive access to the first and/or second master keys in plaintext form.

A still further feature provides for the method to include storing the one or more derived keys in the remote database of the backend server.

A yet further feature provides for the method to include generating the first and/or second master keys on the computing device of the administrator of the network.

A further feature provides for the first and/or second master keys to be non-ephemeral.

In accordance with a further aspect of the invention there is provided a computer program product for protecting data, the computer program product comprising a computer-readable medium having stored computer-readable program code for performing the steps of:

enabling a backend server to provide a secure data storage facility to a network, the network being managed by an administrator utilising an administrator computing device on the network;

providing at least one key controller to be hosted on the network; and protecting data of the network with a hierarchy of cryptographic keys that are distributed between the network, the key controller and the backend server, the hierarchy of keys comprising a first master key that is associated with the administrator and a second master key that is associated with the key controller and one or more derived keys that are derived from the first and second master keys, wherein at least one of the first and second master keys are kept resident on the network and at least one of the derived keys are kept resident on the backend server, thereby inhibiting the backend server from obtaining access to plaintext data and plaintext master keys of the network.

Further features provide for the computer-readable medium to be a non-transitory computer-readable medium and for the computer-readable program code to be executable by a processing circuit.

An embodiment of the invention will now be described, by way of example only, with reference to the accompanying drawings.

DETAILED DESCRIPTION WITH REFERENCE TO THE DRAWINGS

There is provided a data protection system for providing data security to a customer. The customer's data is stored at a remote database or storage facility of a backend server or cloud-based server which may be operated by a vendor. The customer's data may be encrypted using a hierarchy of keys or multiple layers of encryption keys. The multiple layers, or hierarchy of encryption keys include higher level keys and lower level keys or subordinate keys. The higher level keys may be referred to as principal or master keys, and the lower level keys may be referred to as derived keys. The keys may comprise asymmetric key-pairs as are used in asymmetric cryptography, or in some instances symmetric keys may be used. Plaintext, clear text or unencrypted principal keys or master keys may be stored on a network or customer network, whereas derived keys may be stored at the backend and/or in the cloud in the secure data storage facility. The vendor or operator of the backend server and/or unscrupulous parties may be inhibited or prevented from having access to plaintext data and/or encryption keys of the customer or network. The network may be controlled by the customer and a key controller or key management application may be installed onto the network and may be responsible for management of keys on the network and for encryption and decryption of data of the customer when the data is transmitted between the network and the cloud or backend server.

Figure 1:
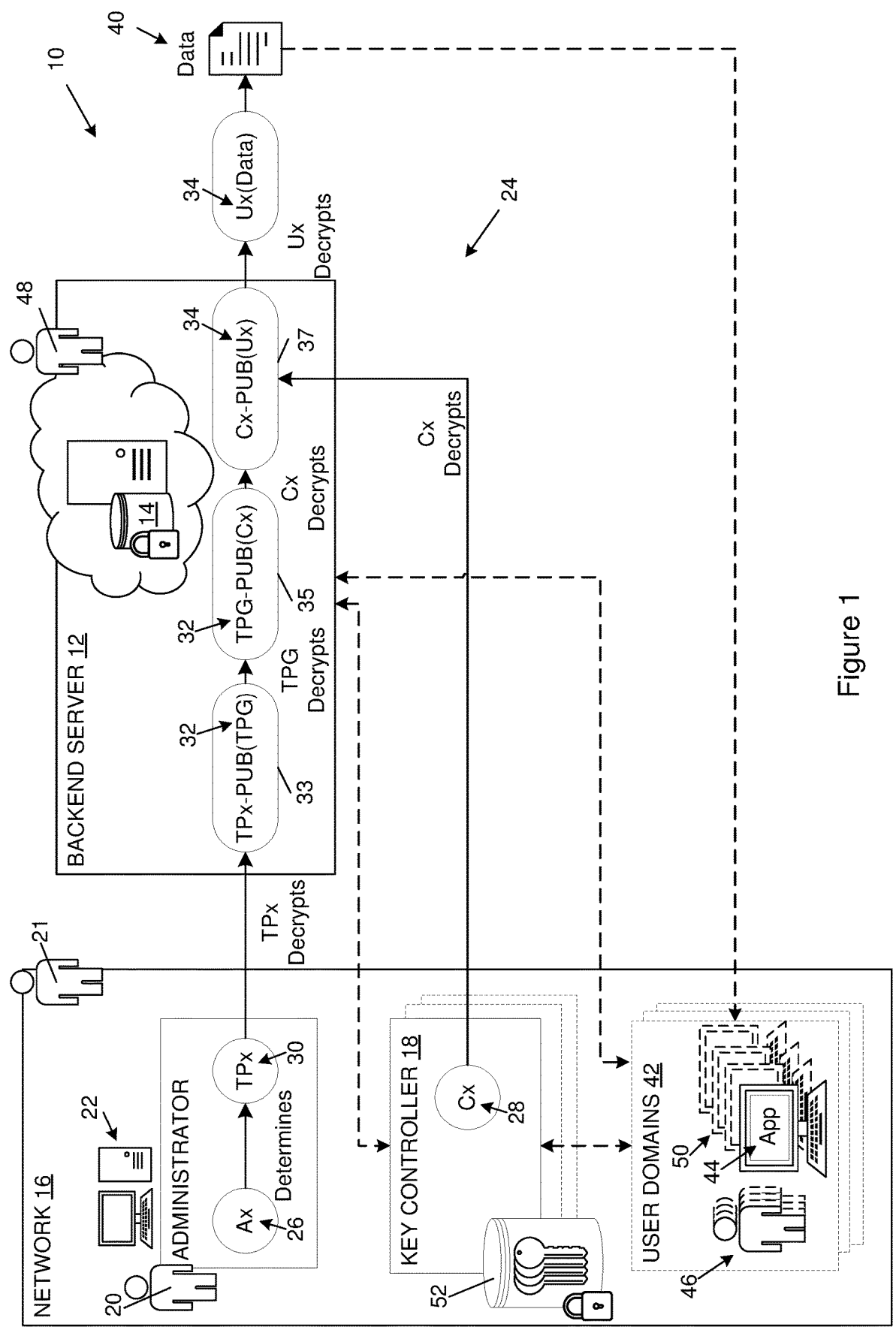
FIG. 1 is a high-level block diagram illustrating an exemplary data protection system.

Referring to FIG. 1, there is shown a data protection system (10). The system (10) comprises a backend server (12) which provides a secure data storage facility or remote database (14) to a network (16). The network (16) of a customer (21) may be managed by an administrator (20) (often referred to simply as the "admin") utilising an administrator computing device (22) on the network (16). In some instances there may be multiple administrators, for example where the customer is a large corporate entity. At least one key controller (18) may be provided and hosted on the network (16). The system may provide for a hierarchy (24) of cryptographic keys (26, 28, 30, 32, 33, 34, 35, 37) for cryptographically protecting data (40) of the network (16). The hierarchy (24) of keys may be distributed between the administrator computing device (22), the key controller (18) and the backend server (12). The hierarchy (24) of keys may comprise a first master key (26) that may be associated with the administrator (20) and a second master key (28) that may be associated with the key controller (18). One or more derived keys (30, 32, 33, 34, 35, 37) may be derived from the first and second master keys (26, 28) and/or may be generated. The first and second master keys (26, 28) may be kept resident on the network (16) and at least one of the derived keys (30, 32, 33, 34, 35, 37) may be kept resident on the backend server (12), thereby inhibiting the backend server from obtaining access to plaintext data (40) and plaintext master keys (26, 28) of the network (16).

A plurality of user domains (42) may be provided on the network (16) and may include one or more user applications ("apps") (44) of a plurality of users (46) (which may be the end-users of the system (10)), which user apps may be installed by the users themselves, or usually by the administrator (20), on user computing devices (50) forming part of the network (16). These user apps (44) could be in the form of software, or may be web-based apps such as JavaScript or HTML-based apps running through a browser. The user applications (44) may be in communication with the key controller (18) to enable the users (46) to view plaintext data (40) from the cloud-based or remote database (14), by decrypting the data using at least one of the first and second master keys (26, 28).

Figure 2:
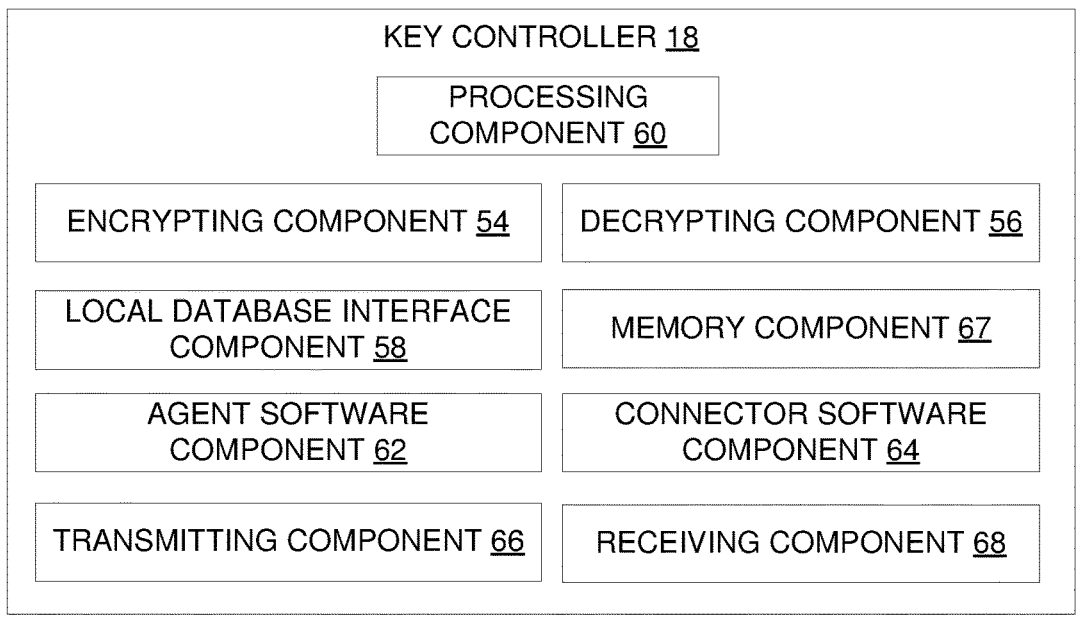
FIG. 2 is a high-level block diagram of an exemplary key controller, forming part of the system of FIG. 1.

The key controller (18) may be in the form of a software service which may be provided by a vendor (48) or operator of the backend server (12). The key controller (18) may be installed on the network (16), for example by the administrator (20), but the key controller (18) may be owned by and/or under the control of the customer (21). If, for some reason one or more of the key controllers (18) become lost, they may be re-created. It will be appreciated that the vendor (48) does not have control over the administrator (20). Services provided by the vendor (48) via the cloud or backend server (12) may be external to the network (16). Each of the at least one key controller (18) may provide keys to a relevant user domain (42) and each domain may comprise a set of users (46) with their respective computing devices (50). The system (10) may be configured such that the vendor or backend server (12) may not have access to plaintext data and/or encryption keys of the network (16). The data (40) of the network (16) may be encrypted by the user application (44). The key controller is also shown in FIG. 2 which is discussed in more detail below.

The first master key (26) denoted Ax, may be in the form of a password selected by the administrator (20). The second master key (28) denoted Cx, may be generated by the key controller (18) on the network (16). The one or more derived, or lower level keys (30, 32, 33, 34, 35, 37) may be derived from the first and second master keys Ax and Cx (26, 28) and/or may be generated by the key controller (18). The derived keys (30, 32, 33, 34, 35, 37) include TPx (30), which may be derived from Ax (26). TPG (32) and Ux (34) may be generated by the key controller (18). Some of the derived or lower level keys may also be in the form of a key-encrypted-key (KEK) such as TPx-PUB(TPG) (33), TPG-PUB(Cx) (35) and Cx-PUB(Ux) (37). Hence, the hierarchy of keys (24) comprise a plurality of encryption layers that are applied to encrypt the data (40) of the network (16) and Ux (34) may be the final layer that is applied to the data by the system (10). The encryption layers and the various derived and/or generated keys will be discussed in further detail below.

Customer Account Creation

Figure 3:
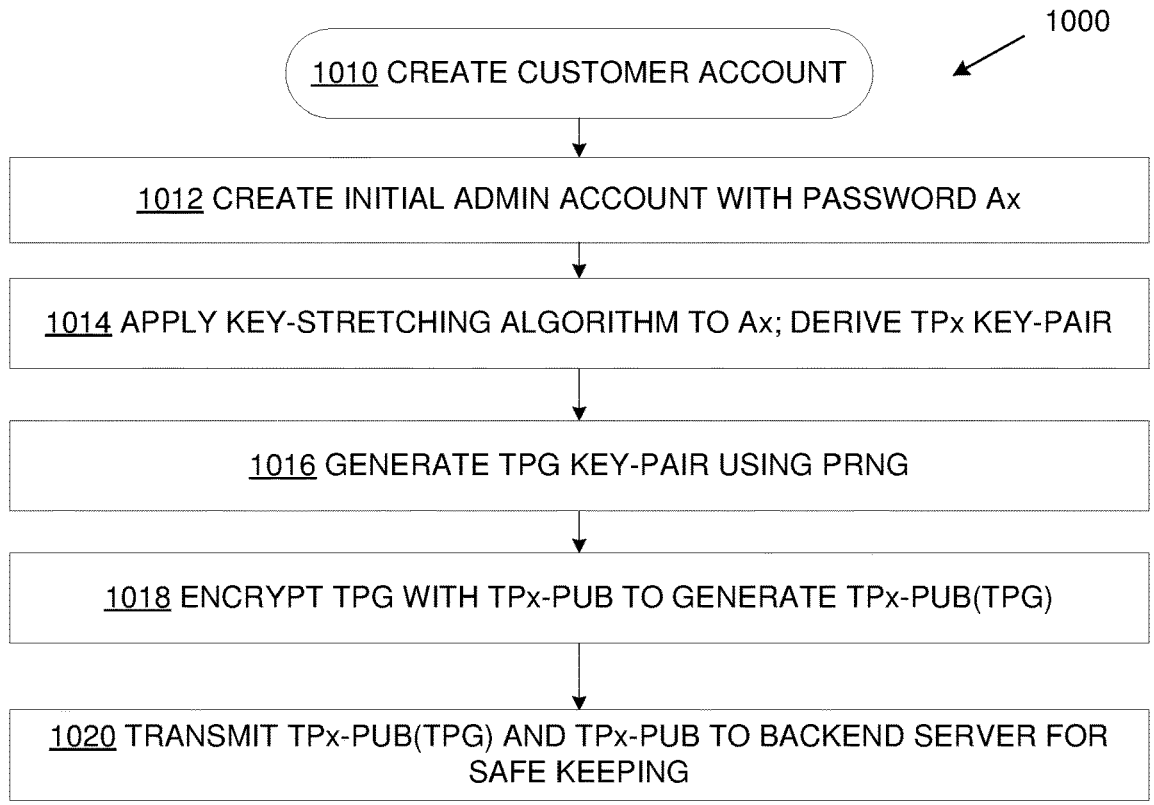
FIG. 3 is a high-level flow diagram illustrating an exemplary customer account creation process.

As shown in the flow diagram (1000) in FIG. 3, a customer account may be created (1010) at the backend server (12) for the customer (21). The customer account may be in the form of a software as a service (SaaS). An initial customer administrator account may then be created (1012) with administrator password Ax (26). A key stretching algorithm may be applied (1014) to Ax to derive a key-pair TPx (30) (which may comprise a private key or portion and a public key or portion as is discussed in more detail below). A customer key-pair TPG (32) may also be generated (1016) using a pseudorandom number generator (PRNG). TPG may then be encrypted (1018) with the public key portion of TPx to generate key-encrypted-key TPx-PUB(TPG) (33). TPx-PUB(TPG) (33) and the public portion of TPx (30) may then be transmitted (1020) from the network (16) to the backend server (12) for safe keeping in the database (14), which may also be referred to as a vault. The system (10) may be configured such that the administrator password Ax (26) never leaves the administrator's web browser and even there, it only exists ephemerally. It should also be noted that the second master key Cx (28) will only exist on the network (16) in that it exists on the key-controller (18) (and/or on an "ADconnector" service which is discussed in more detail below).

Set-Up of Key Controller

Figure 4:
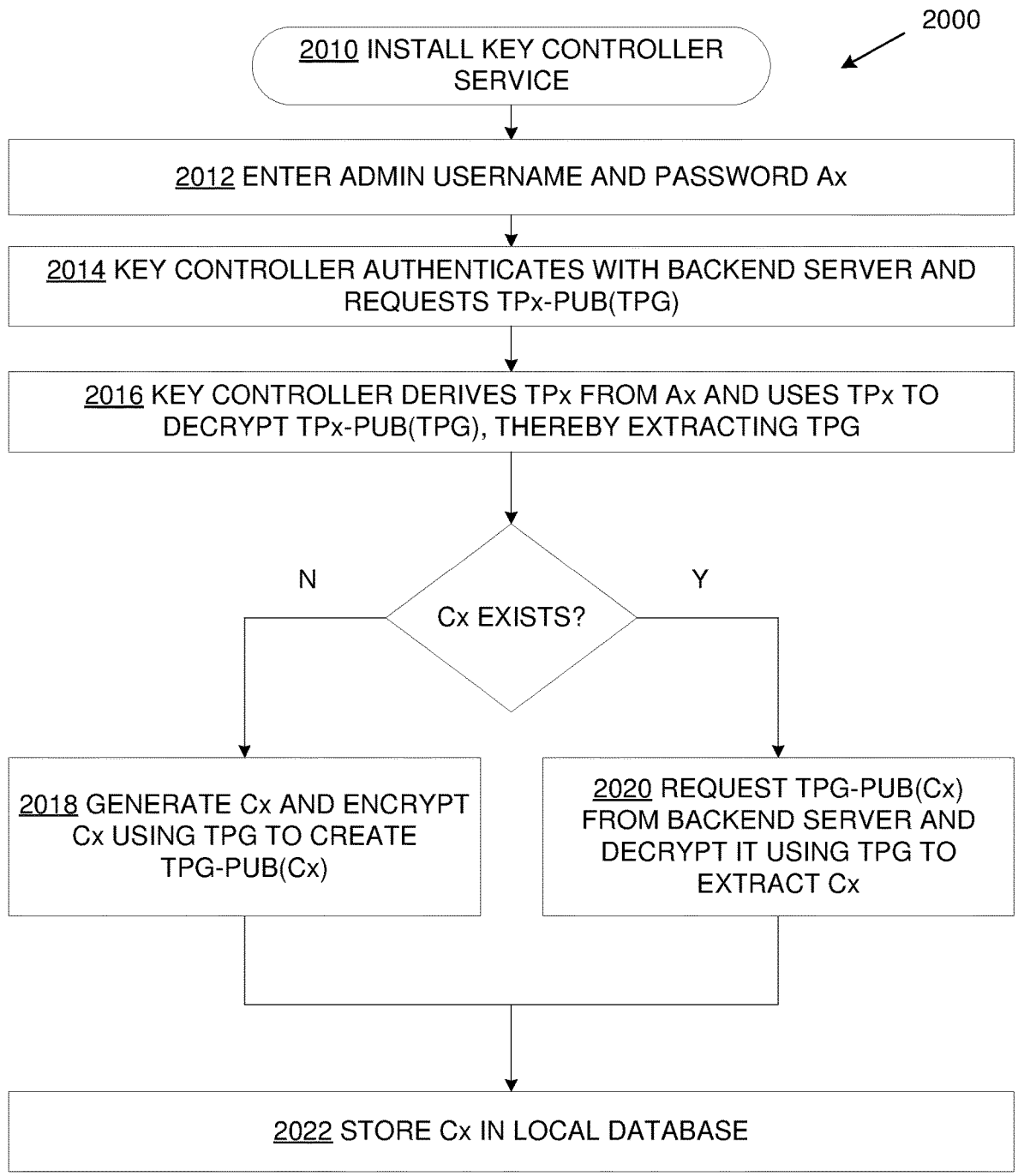
FIG. 4 is a high-level flow diagram illustrating an exemplary set-up process of the key controller.

A customer identity management system (not shown) may be provided on the network (16). As shown in the flow diagram (2000) in FIG. 4, set-up of the key controller (18) may be performed by the administrator (20) by installing (2010) the key controller service. The key controller (18) may be connected to, or may have access to the customer identity management system. The administrator (20) may then enter (2012) an administrator username and password Ax (26). The key controller (18) may then perform (2014) an authentication process with the backend server (12) and may then request TPx-PUB(TPG) and receive it from the backend server (12). Next, the key controller (18) may derive (2016) TPx from Ax and use TPx to decrypt the received TPX-PUB(TPG), thereby extracting TPG. If the relevant user domain (42) serviced by the key controller (18) does not yet have an established second master key Cx (28) (which may be referred to as the key controller key-pair Cx), then the key controller may generate (2018) Cx (for example using a PRNG). Cx (28) may then be encrypted by the key controller (18) by using TPG (32) to create key-encrypted-key TPG-PUB(Cx) (35) which may be transmitted to the backend server (12) to be stored in the remote database (14). On the other hand, if the relevant user domain (42) serviced by the key controller (18) already has an established key controller key-pair Cx (28), then the key controller (18) requests (2020) the key-encrypted-key TPG-PUB(Cx) (35) from the backend server (12) and decrypts it using TPG to extract Cx. The retrieved (2020), or generated (2018) Cx, as the case may be, may then be securely stored (2022) locally on the network (16), for example in a local database (52).

Distribution and Re-Distribution of Keys by the Key Controller

Figure 5:
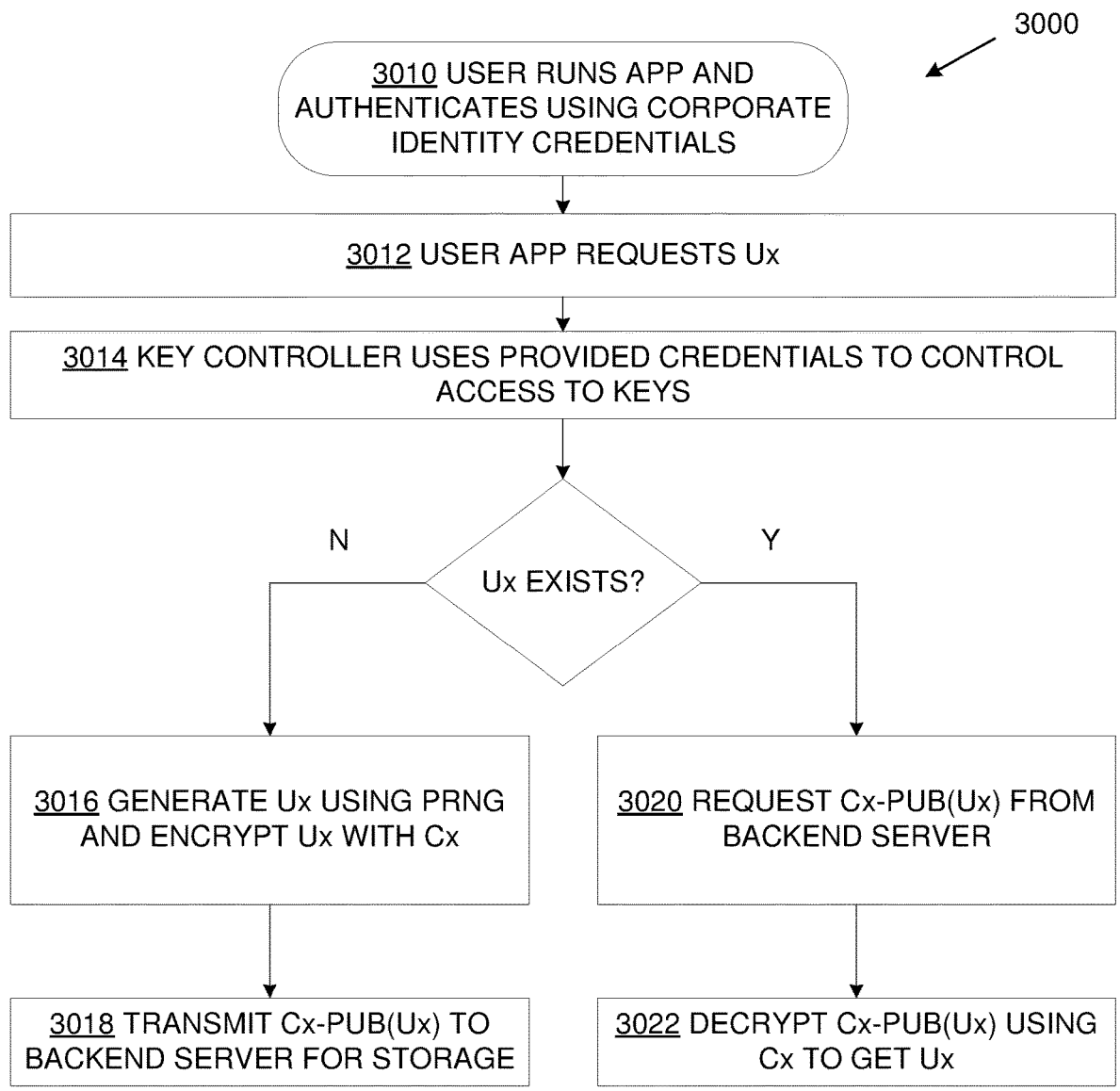
FIG. 5 is a high-level flow diagram illustrating an exemplary process for distribution and re-distribution of keys by the key controller.

The key controller (18) may be configured to distribute and to re-distribute encryption keys in the network (16). This is illustrated in the flow diagram (3000) in FIG. 5. A user (46) may for example run (3010) an app (44) and perform an authentication process with the customer's identity management system. The user app (44) may then communicate with the key controller (18) to request (3012) Ux (34) (if it exists) to decrypt data, and may provide credentials of the user that are recognized by the identity management system. The key controller (18) may then use the provided credentials of the user (46) to control (3014) access to keys. As result, the customer organization (21) may have automated control over access to keys and, by extension, the customer's data (40). Ux (34) may be the final encryption layer applied to the data (40), as described above. If Ux (34) does not already exist, the key controller (18) may generate (3016) Ux (for example using a PRNG) and may encrypt Ux with Cx and transmit (3018) a key-encrypted-key Cx-PUB(Ux) (37) to the backend server (12) to be stored. If the requested Ux (34) does exist, then the key controller (18) requests (3020) the key-encrypted-key Cx-PUB(Ux) (37) from the backend server (12) and decrypts (3022) Cx-PUB(Ux) with Cx to get Ux, so that the data (40) may be decrypted on the customer-side for viewing by the user (46). The data (40) may be stored in encrypted form (using the hierarchy of keys (24)) in the remote database or vault (14).

Tenant and Admin On-Boarding

From the backend server side or vendor side, the customer may be referred to as a tenant. An initial customer/administrator "on-boarding" (or registration) process may be performed as follows: An account manager at the backend server may create a new customer account or tenant account by inviting an initial administrator (20) of the customer (21) to the tenant account, for example via e-mail. An invitation e-mail may be sent to the administrator (20) which may include a one-time JWT token (a JavaScript Object Notation (JSON) Web Token) for authentication.

Figure 6:
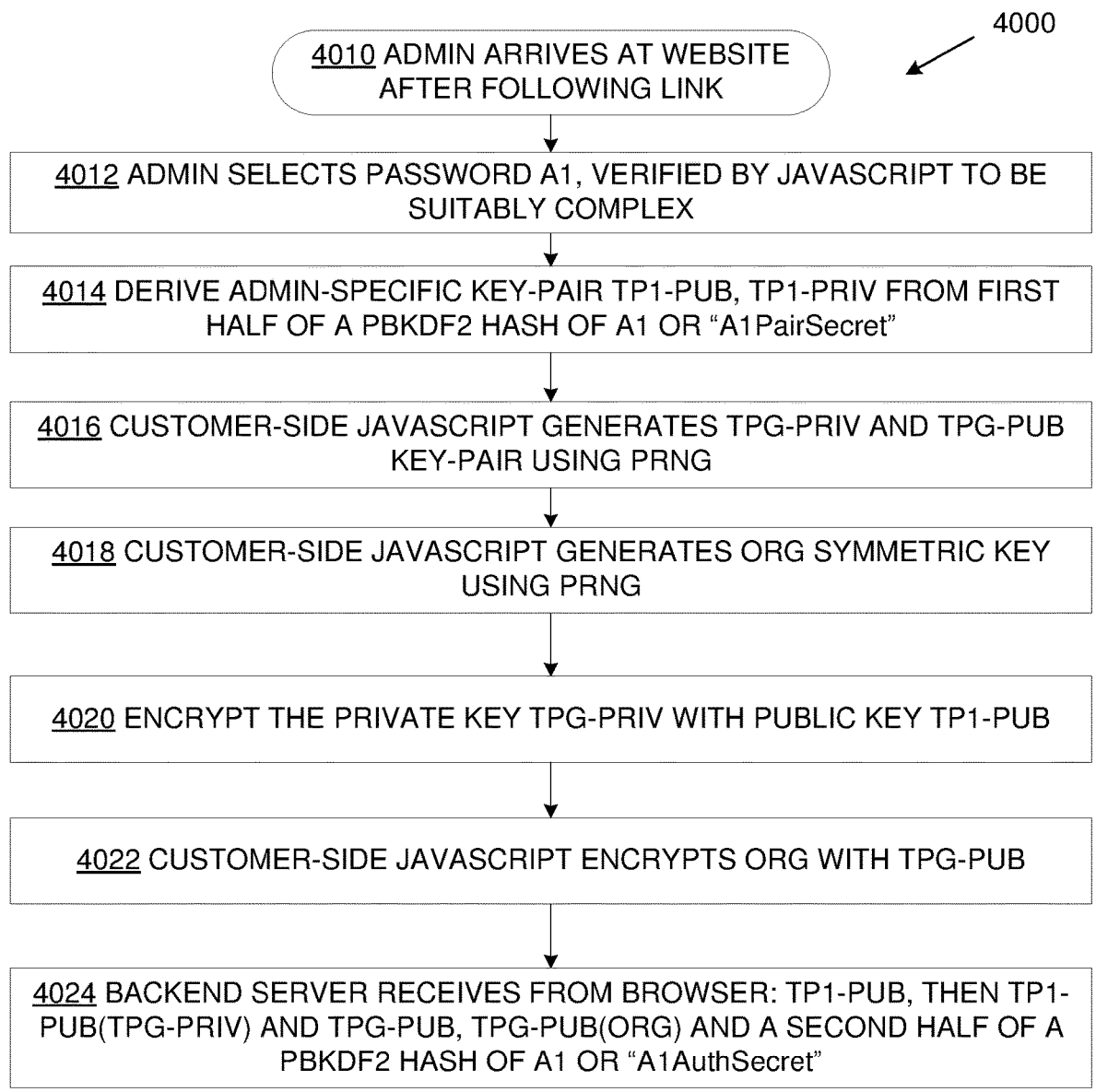
FIG. 6 is a high-level flow diagram illustrating an exemplary process for an initial admin "on-boarding" process.

Referring now to the flow diagram (4000) in FIG. 6, a link may be provided in the invitation e-mail, and after following the link, the administrator (20) may arrive (4010) at a website of the vendor (48). The initial or first administrator (20) may then select (4012) a first administrator password A1 which may be verified by JavaScript to be suitably complex. The first administrator password may be denoted A1 (as opposed to the more generally denoted Ax for administrator password(s)). This denoting convention may also be applied to the other keys depicted in the other figures and disclosed herein, such as TPx, Cx and Ux as appropriate. It will also be appreciated that in this specification, "PUB" may refer to the public portion of the relevant key, whereas "PRIV" may refer to the private portion of the relevant key. An admin-specific key-pair TP1-PUB, TP1-PRIV may then be derived (4014) from a first half a Password-Based Key Derivation Function (PBKDF) hash of A1 (or any other suitable key derivation function may be used such as such as PBKDF2, or PBKDF1). This admin-specific key-pair may be denoted "PBKDF2(A1)[0]" or "A1 PairSecret" (or more generally "AxPairSecret"). The customer side JavaScript (and/or the admin computing device (22) or the key controller (18)) may then generate (4016) the customer key-pair TPG-PRIV and TPG-PUB using a PRNG. A symmetric key denoted ORG may also be generated (4018) by the customer-side JavaScript (and/or by the admin computing device (22) or key controller (18)) using a PRNG. The customer-side JavaScript (and/or the admin computing device (22) or the key controller (18)) may then encrypt (4020) the private portion of the customer key-pair, TPG-PRIV, with the public portion of the admin-specific key-pair TP1-PUB, whereafter ORG may be encrypted (4022) with TPG-PUB. The backend server (12) may then (via the cloud or via the Internet/browser) receive (4024) TP1-PUB, then TP1-PUB(TPG-PRIV) and TPG-PUB, TPG-PUB(ORG) and a second half of a PBKDF2 hash of A1, which may be denoted as "PBKDF2(A1)[1]" or "A1 AuthSecret" (or more generally "AxAuthSecret").

Subsequently, further administrator(s) (20) may be registered or "on-boarded" by following the link as described above. The relevant administrator then selects a suitably complex password Ax (26). Then, an admin-specific key-pair TPx-PUB and TPx-PRIV may be derived from AxPairSecret. Next, the backend server (12) may receive TPx-PUB and AxAuthSecret. At this point, during a subsequent admin on-boarding, the relevant admin (20) might not yet have access to private key TPG-PRIV.

Admin Password Change

Figure 7:
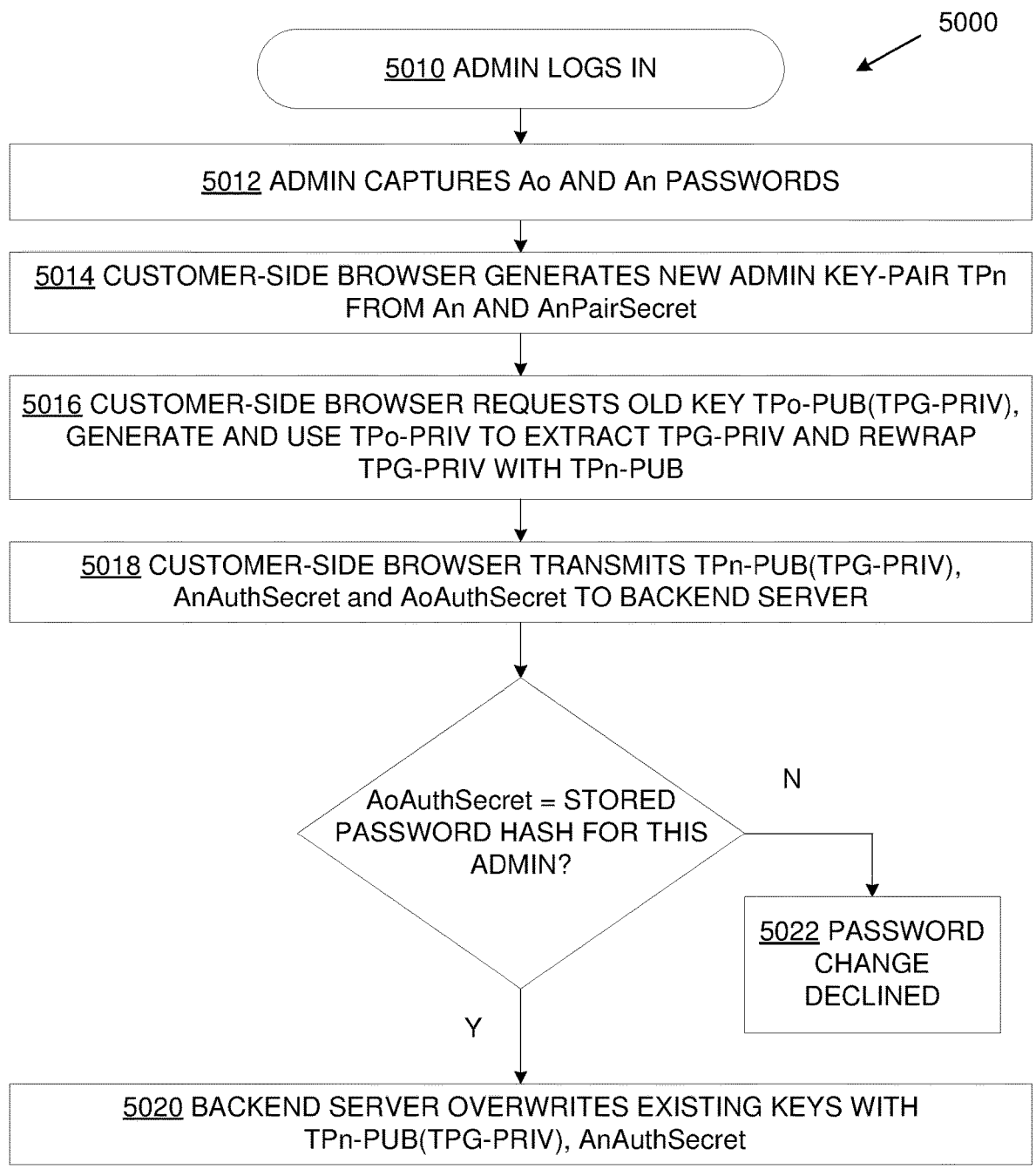
FIG. 7 is a high-level flow diagram illustrating an exemplary process for an admin password change.

Administrators (20) may from time to time need to change their passwords Ax. To do this (and as is illustrated in the flow-diagram in FIG. 7), the relevant admin (20) may log into (5010) the customer account (and/or an admin account). The admin then captures (5012) old (Ao) and new (An) passwords (where "n" is used to denote "new" and "o" is used to denote "old", which denoting convention may be applied throughout this specification). The customer-side browser may then generate (5014) a new admin key-pair TPn using An and AnPairSecret (using a similar method as described above). The customer-side browser may then request (5016) the old key-encrypted-key TPo-PUB(TPG-PRIV) from the backend server (12), and may generate and/or use TPo-PRIV to extract TPG-PRIV and may then re-encrypt (or "re-wrap") TPG-PRIV with TPn-PUB. Then, the customer-side browser transmits (5018) to the backend server (12): TPn-PUB, TPn-PUB(TPG-PRIV), AnAuthSecret and AoAuthSecret (if AoAuthSecret is valid). Then, if the backend server (12) determines that AoAuthSecret matches the previously stored password hash for the currently logged in admin (20), it may overwrite (5020) existing keys with TPn-PUB, TPn-PUB(TPG-PRIV), AnAuthSecret. Otherwise, the password change request may be declined (5022) by the backend server.

Admin Key Sharing

Figure 8:
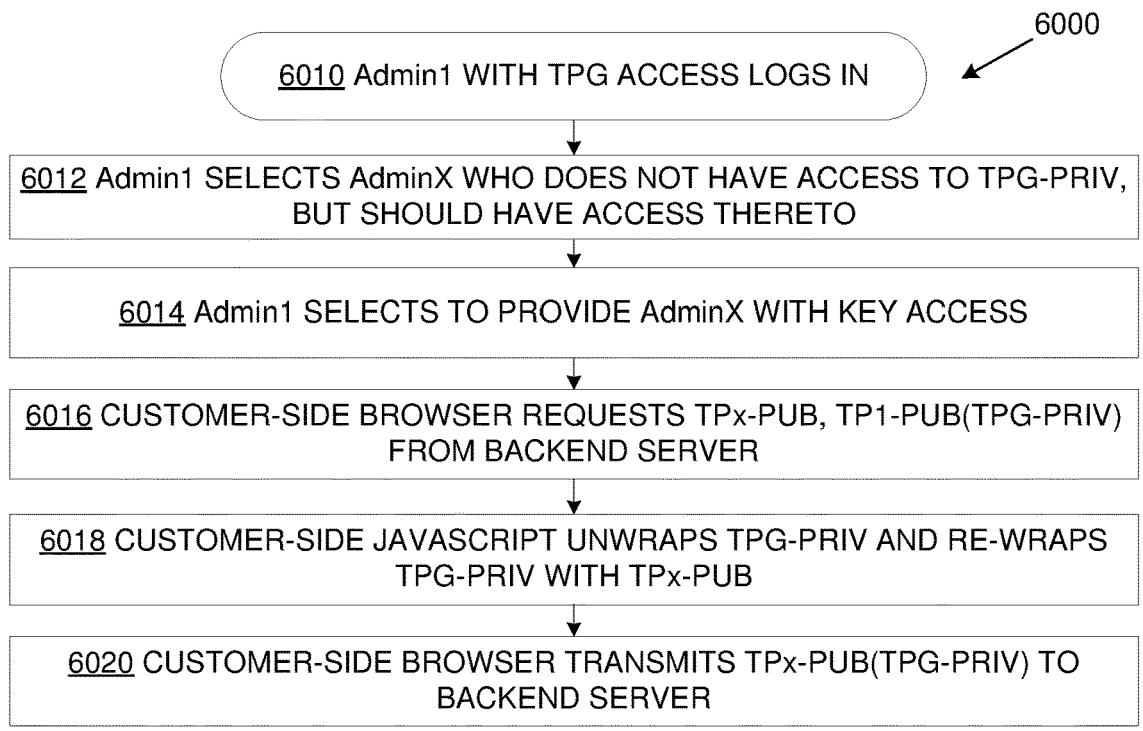
FIG. 8 is a high-level flow diagram illustrating an exemplary process for an admin key sharing process.

Admins (20) may also be enabled to share keys with other administrators. An exemplary process for admin key sharing is illustrated in the flow-diagram (6000) in FIG. 8. Admin1 with TPG (32) access may log into (6010) the relevant customer account. Admin1 may then, using a provided user interface (UI), select (6012) another administrator, AdminX, from a list, where AdminX does not have access to TPG-PRIV, but should have access thereto. Admin1 may then, via the UI, select (6014) to provide AdminX with the necessary key access. The customer-side browser then requests (6016) TPx-PUB and TP1-PUB(TPG-PRIV) from the backend server (12). The customer-side JavaScript then decrypts (6018) (or "unwraps") TPG-PRIV and re-encrypts (or "re-wraps") TPG-PRIV with TPx-PUB, whereafter TPx-PUB (TPG-PRIV) is transmitted (6020) to the backend server (12).

Admin Forgot Password

Administrators (20) may also forget their passwords Ax (26) from time to time. AdminX may for example have forgotten their password Ax (26), rendering a requested TPx-PUB and TPx-PUB(TPG-PRIV) useless (and hence these keys may be deleted by the system(10)). Keys may, in such a scenario, be re-shared with AdminX as described above with reference to FIG. 8.

It will be appreciated that, in the event that all the administrator passwords Ax (26) are lost or forgotten for some reason, the key hierarchy (24) may be re-built from Cx (28) up. This may require new key-encrypted-keys TPx-PUB(TPG) (33) and TPG-PUB(Cx) (35) to be provided from the network (16) to the backend server (12), based on Cx (28) values available from the network's (16) key controllers (18). I.e. Cx (28) may be generated by the key controller as described above (for example using a PRNG) and Cx (28) may then be encrypted by the key controller (18) by using TPG (32) to create key-encrypted-key TPG-PUB(Cx) (35) which may be transmitted to the backend server (12) to be stored. An initial (new) admin password A1 may be selected as described above, and some of the mentioned steps may need to be repeated as necessary.

Key Controller

Referring to FIG. 2, the key controller (18) is shown in more detail. The key controller may include a processor or processing component (60) for executing the functions of components described below, which may be provided by hardware or by software units executing on the key controller. The software units may be stored in a memory component (67) and instructions may be provided to the processor (60) to carry out the functionality of the described components. In some cases, for example in a cloud computing implementation, software units arranged to manage and/or process data on behalf of the components of the system (10) may be provided remotely. Some or all of the components may be provided by software application(s) downloadable onto and executable on the network (16). The key controller (18) may comprise an encrypting component (54), a decrypting component (56), a local database interface component (58), the processing component (60) (which may be provided by any relevant computing device forming part of the network (16)), an agent software component (62), a connector software component (64), a transmitting component (66) and a receiving component (68). The connector and agent software components will be discussed in more detail below.

Initial Connector Software Installation Per Domain

Figure 9:
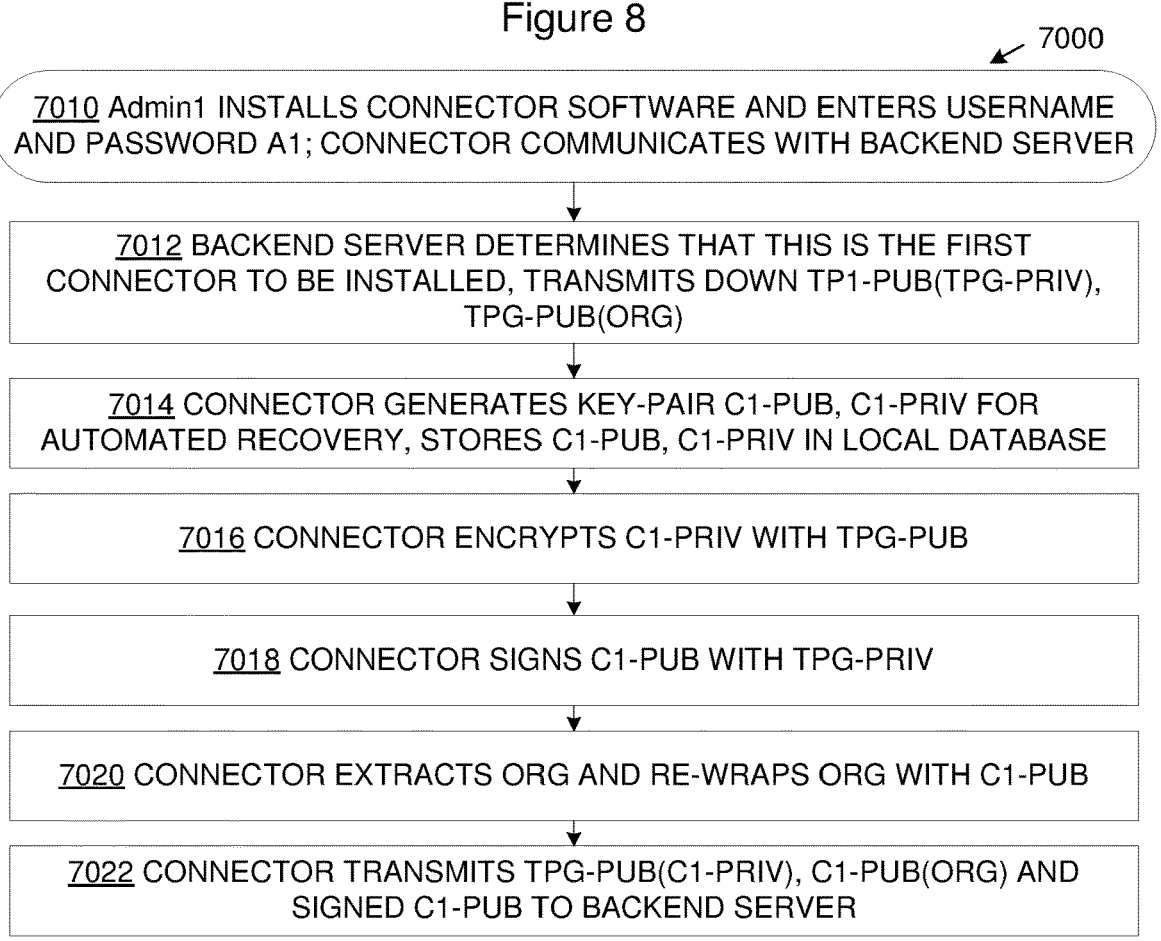
FIG. 9 is a high-level flow diagram illustrating an exemplary installation process of connector software.

The connector or connector software component (64) of the key controller (18) may comprise so-called "on-premise software". A connector (64) may be provided for each of the user domains (42). A flow diagram (7000) illustrating an exemplary installation process of the connector software is shown in FIG. 9. The administrator (20), e.g. Admin1, may install (7010) the connector software on the network (16) and may enter their admin username and password A1. The connector or key controller (18) may be configured to negotiate or communicate with the backend server (12). The connector or key controller (18) may be owned by and/or under control of the customer (21) on the network (16). The backend server (12) may then determine that this is the first connector (or key controller (18)) to be installed on the network (16), and may transmit (7012) TP1-PUB(TPG-PRIV), and TPG-PUB(ORG) to the key controller (18). The key controller (18) (and/or the connector) then generates (7014) a key pair C1-PUB, C1-PRIV which may be used for automatic recovery. The key controller (18) may then store C1-PUB and C1-PRIV in the local database (52), and may use Data Protection Application Programming Interface (DPAPI) or may use what is referred to in cryptography as a keychain or a keyring. The key controller (18) may then encrypt (7016) C1-PRIV with TPG-PUB, whereafter the key controller (18) (or connector) may sign (7018) C1-PUB with TPG-PRIV. This may prevent man-in-the-middle (MITM) attacks because a substitute TPG pair used in such an attack by the cloud or backend server (12) (or by a third party) may result in a signature on C1-PUB which may be rejected on the customer-side by the agent software component (62). If the aforementioned rejection by the agent occurs, C1-PRIV, acquired by employing said attack, may be rendered useless. The connector or key controller (18) may then extract (7020) ORG and rewrap or re-encrypt it with C1-PUB. TPG-PUB (C1-PRIV), C1-PUB(ORG) and signed C1-PUB may then be uploaded or transmitted (7022) to the backend server (12). It will be appreciated that the agent software component (62) may be configured to run on one or more of the user computing devices (50) forming part of the network (16), and may be provided separately from the key controller (18).

Connector Re-Installation Per Domain

Figure 10:
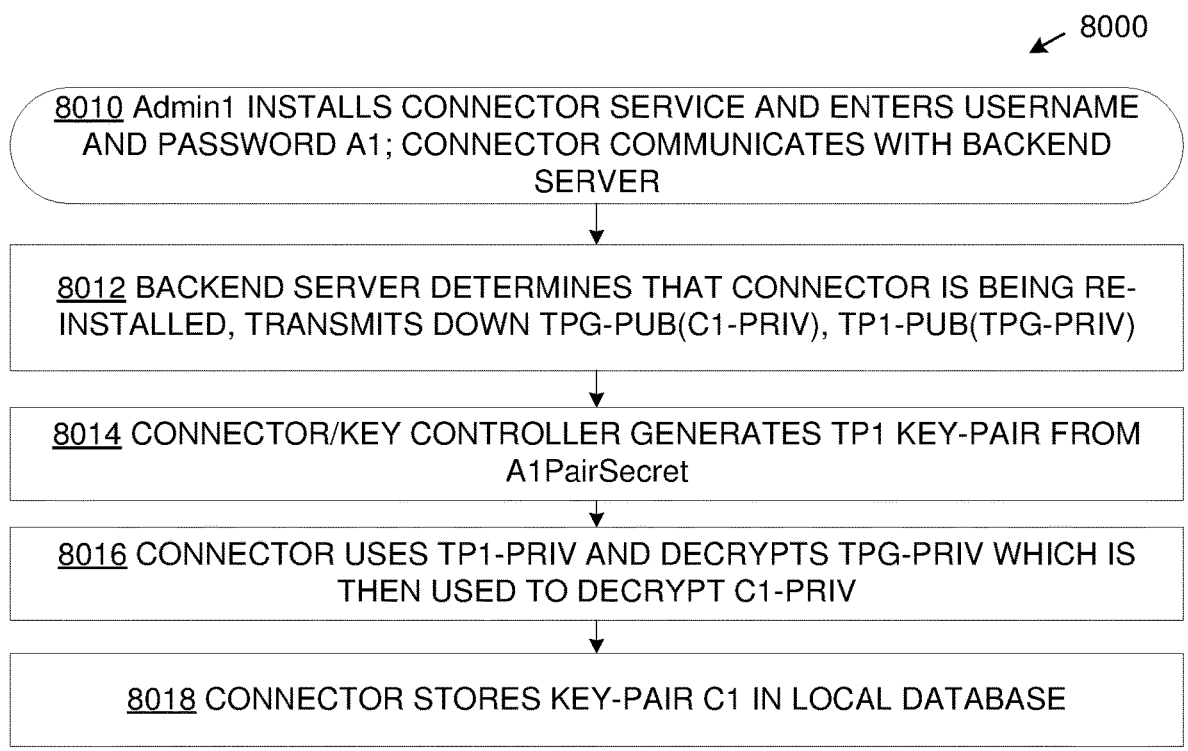
FIG. 10 is a high-level flow diagram illustrating an exemplary re-installation process of the connector software.

The connector service (64) may need to be re-installed for a relevant user domain (42) from time to time. A flow diagram (8000) illustrating an exemplary re-installation process of the connector software is shown in FIG. 10. The administrator (20), for example Admin1, may then install (8010) the connector service and enter their administrator name and password A1. The connector (64) (or key controller (18)) may then communicate or negotiate with the cloud or backend server (12). The backend server (12) may determine that a connector service is being re-installed and may then transmit (8012) or "send down" TPG-PUB(C1-PRIV) and TP1-PUB(TPG-PRIV). A TP1 key-pair may then be generated (8014) by the key controller (18) (or by the connector) from A1 PairSecret. Using TP1-PRIV, the connector (64) (or key controller (18)) may then decrypt (8016) TPG-PRIV, which may, in turn, be used to decrypt C1-PRIV. The connector or key controller may then store (8018) a key-pair C1 in the local database (52) as described above.

Agent Installer Package Build

An agent installer package may be provided by the system (10). After initial tenant or customer set-up has been performed, Admin1 may request the agent installer from the backend server (12). A build process may then be initiated and the backend server (12) may embed TPG-PUB into the agent installer during the build process. Admin1 may then deploy or install the agent (62) installer to the network (16) on an ongoing basis.

Agent Registration

Figure 11:
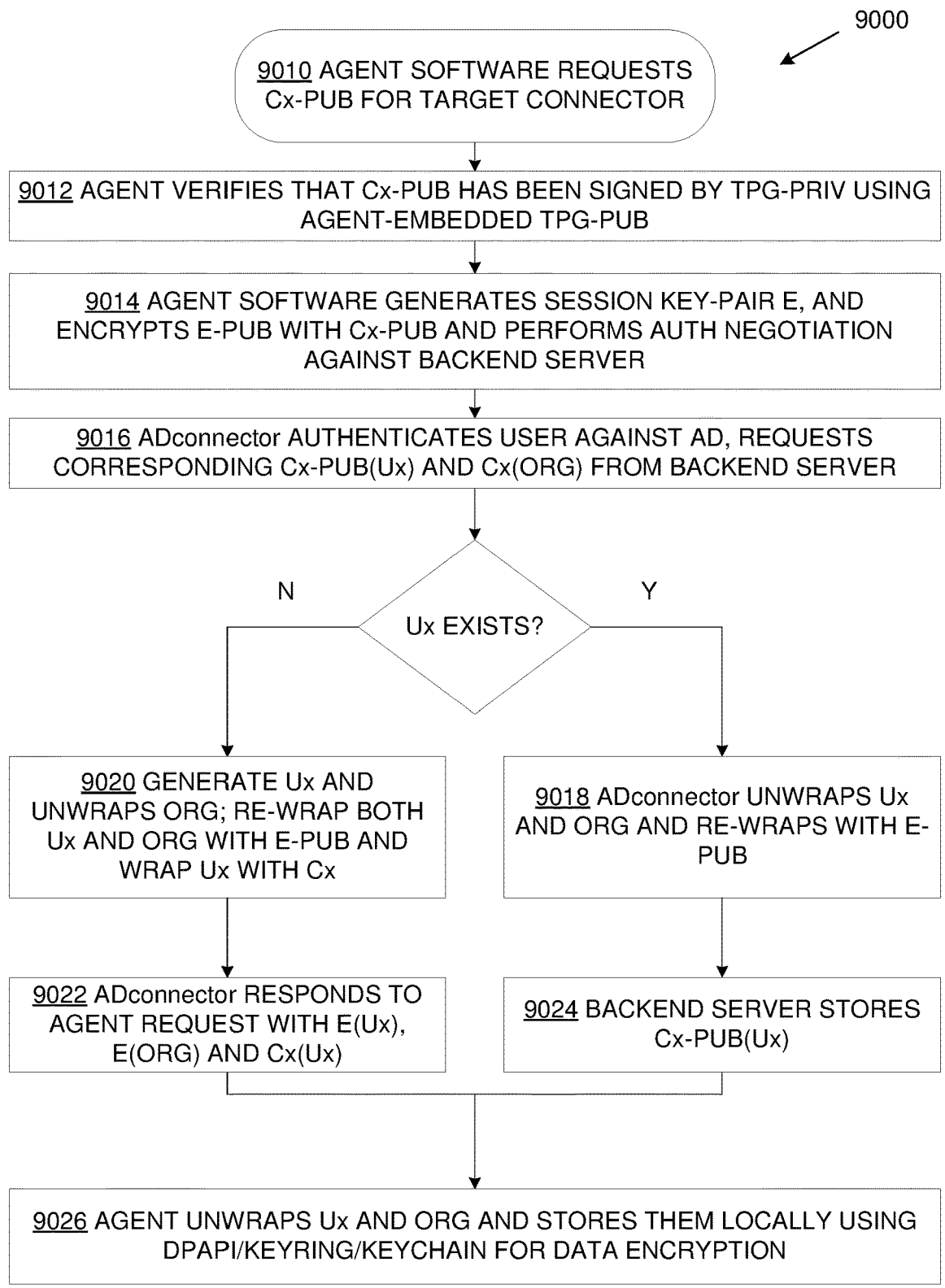
FIG. 11 is a high-level flow diagram illustrating an exemplary agent registration process.

The agent software component (62) may form part of the key controller (18), or may be provided separately from the key controller (18) and/or may be operable to execute on one or more of the user computing devices (50) forming part of the network (16). The agent software component (62) may need to be registered with the vendor (48), or operator of the backend server (12). An exemplary flow-diagram (9000) illustrating this agent registration process is shown in FIG. 11. For this registration, the agent software (62) may request (9010) Cx-PUB for a particular or targeted connector (64) and may verify (9012) that Cx-PUB has been signed with TPG-PRIV using the agent-embedded TPG-PUB. The agent software (62) may then generate (9014) a session key-pair E and encrypt E-PUB with Cx-PUB and may perform a Windows™ Hypertext Transfer Protocol (HTTP) authorisation (and/or authentication) negotiation against the backend server (12) with Cx-PUB(E-PUB) as payload which may be transmitted or "proxied" to an active directory connector or "ADconnector" which may form part of the connector software component (62) of the key controller (18). The ADconnector may then authenticate (9016) the relevant user (end-user (46), or admin (20), as the case may be) against the active directory (AD) and may request a corresponding Cx-PUB(Ux) (37) and Cx(ORG) from the backend server (12). If Ux (34) exists, the key controller (18) (or the ADconnector of the connector component (64)) may decrypt or unwrap (9018) Ux using Cx, and decrypt ORG using Cx, and re-wrap or re-encrypt these with E-PUB. If on the other hand Ux does not yet exist, the ADconnector (or key controller(18)) may generate (9020) Ux and then decrypt or unwrap ORG using the generated Ux, after which both Ux and ORG may be re-wrapped or re-encrypted with E-PUB. Ux may then also be encrypted or wrapped with Cx-PUB. The ADconnector may then respond (9022) to the agent request with E(Ux) and E(ORG) and Cx(Ux) (if Ux was generated). The backend server (12) may store (9024) Cx(Ux) if provided (in this case Cx-PUB(Ux) would be stored at the backend server (12)). Next, the agent (62) may unwrap (9026) or decrypt Ux and ORG and may store these in the local database (52) using DPAPI, a keychain or a keyring for data encryption.

Agent Encryption and Backup of Data

Figure 12:
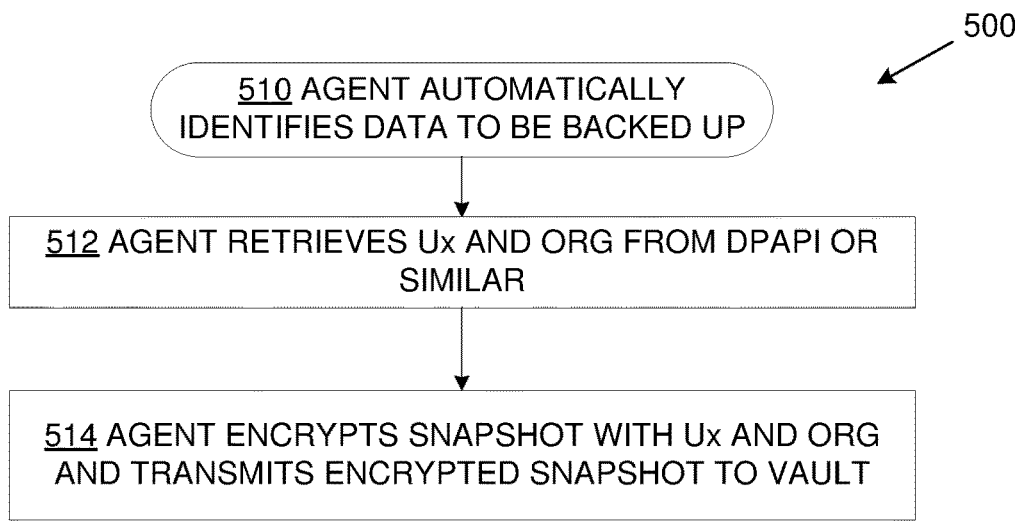
FIG. 12 is a high-level flow diagram illustrating an exemplary backup process.

The agent software component (62) may also be configured to encrypt and to back up data of the network (16). An exemplary flow diagram (500) illustrating a backup process is shown in FIG. 12. The agent software component (62) may be configured to automatically identify (510) data (40) or data files to be backed up. The agent software component (62) of the key controller (18) may then retrieve (512) Ux and ORG keys from DPAPI (or similar), from the local database (52) via the local database interface (58) of the key controller (18). The agent software component (62) may then encrypt (514) a so-called snapshot of data (40) with Ux and ORG keys, and may then transmit this snapshot of the data (40) to the backend server (12) to be securely stored in the vault (14).

Agent Decryption and Restoration of Data

Figure 13:
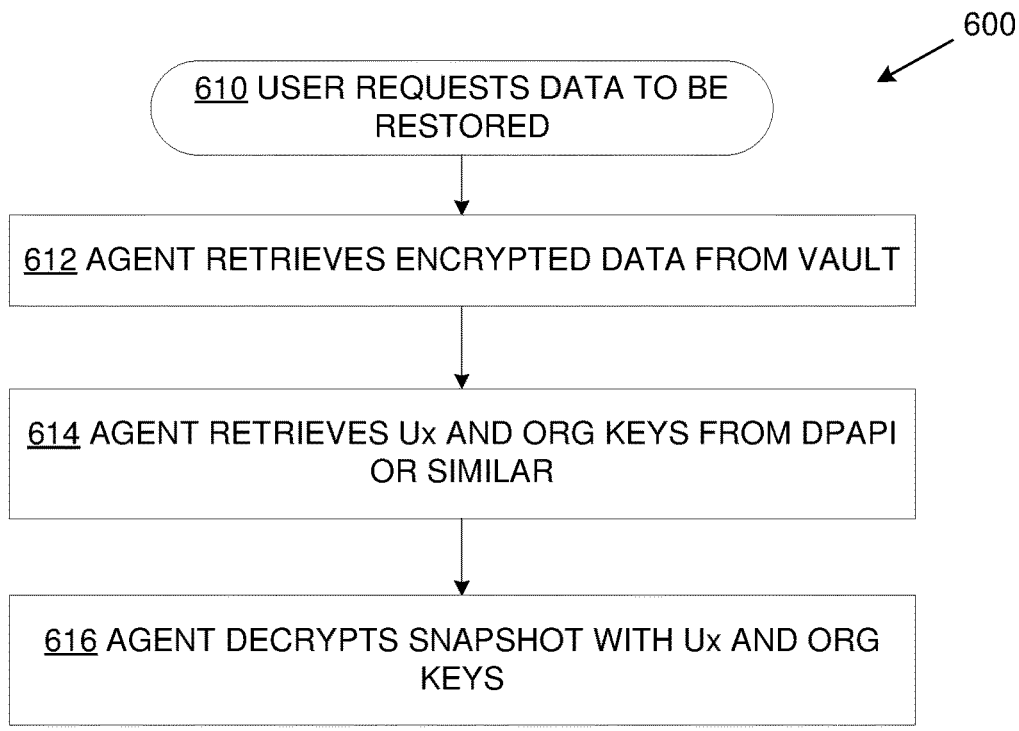
FIG. 13 is a high-level flow diagram illustrating an exemplary data decryption and/or restoration process.

The agent software component (62) may further be configured to decrypt and to restore data. An exemplary flow diagram (600) illustrating a data decryption/restoration process is shown in FIG. 13. A relevant user (46), or admin (20), as the case may be, may request (610) the relevant data (40) to be restored. The agent software component (62) may then retrieve (612) the encrypted data (40) from the vault and the agent software component (62) or key controller (18) may then retrieve (614) the Ux and ORG keys from the DPAPI (or similar) from the local database (52) via the local database interface component (58) of the key controller (18). The agent software component (62) of the key controller (18) may then decrypt (616) the snapshot or data (40) using the Ux and ORG keys, so that the user (46) of the network (16) may view or edit the data (40) as needed.

Figure 14:
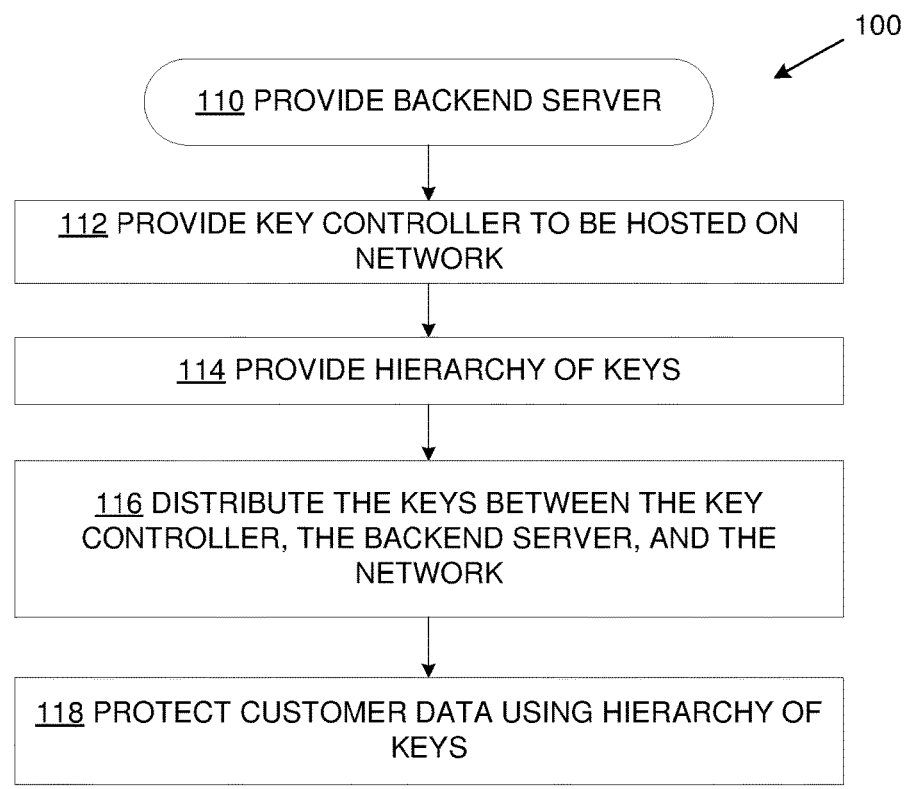
FIG. 14 Is a high-level flow diagram illustrating an exemplary computer-implemented method for protecting data.

Referring to FIG. 14, there is shown a high-level flow diagram illustrating a computer-implemented method (100) for protecting data. The method (100) may comprise providing (110) the backend server (12) for providing the secure data storage facility to the network (16). At least one key controller (18) may be provided (112), to be hosted on the network (16). A hierarchy (24) of cryptographic keys may be provided (114) and distributed (116) between the administrator computing device (22), the key controller (18) and the backend server (12). The data (40) of the network may be protected (118) utilising the hierarchy (24) of keys, thereby inhibiting the backend server from obtaining access to plaintext data (40) and plaintext master keys (26, 28) of the network (16).

Referring again to FIG. 1, the first and second master keys Ax, Cx (26, 28) and in particular their private portions, may be stored in the local database (52) of the network (16). Therefore, the network (16) may be provided with exclusive access to the first and second master keys in plaintext form. The one or more derived keys and/or key-encrypted-keys TPx, TPG, TPX-PUB(TPG), Ux, TPG-PUB(Cx), Cx-PUB (Ux) (30, 32, 33, 34, 35, 37) may be stored in the remote database (14) of the backend server (12) of the system (10). The first and second master keys Ax, Cx (26, 28) may be generated on the computing device (22) of the administrator (20) of the network (16). It will be appreciated that the first and second master keys may be be enduring or non-transient or non-ephemeral which may provide advantages over known systems.

The first and second master keys may provide multi-factor protection, whereby the data of the network is stored in the remote database (14) in a cryptographically protected form, utilising the plurality of encryption layers, thereby requiring a would-be attacker to breach at least the first and second master keys Ax, Cx (26, 28) simultaneously in order to hack or breach the data protection system (10), i.e. the system (10) may provide two or more entry points which rely on different mechanisms to secure key material. This multi-factor protection may be in the form of two-factor protection.

The key controller (18) may hence provide a gatekeeper functionality whereby the key controller (18) automatically manages encryption and decryption of data, which may limit a responsibility of the administrator (20) to only manage their selected password Ax (26), which may provide robustness, security and/or redundancy over prior art systems that the applicant is aware of.

Key derivation and generation processes may be performed on the network (16), and may in particular be performed on the administrator computing device (22), to inhibit or prevent the vendor (or any unscrupulous parties) from having access to plaintext keys and data of the customer. A recoverable key may also be provided to the key controller (18) for encryption and decryption of data encryption keys. The recoverable key may be the first master key (26), in the form of the administrator's password Ax, which may provide a mechanism whereby the second master key Cx (28) of the key controller (18) may be recovered.

It will be appreciated that the various keys are managed transparently, which may avoid risks with careless management of keys. Administrative input or effort from the customer side may also be reduced by the system, because essentially only the administrator passwords need to be managed on the customer side. As mentioned, the key controller of the system may provide a gatekeeper role, which would normally have been provided by the administrator. This gatekeeper key controller functionality may reduce risks for the customer.

Security may also be increased by distributing the encryption keys over various components of the system (between the admin passwords, the local database, the key controller and the cloud-based vault or database). As mentioned, this may require attacker to breach a plurality of components of the system in order to access data or encryption keys. The risk of man-in-the-middle (MITM) attacks may also be reduced by the system disclosed herein. Mechanisms to prevent or alleviate MITM attacks may for example include bootstrapping the key controller with the private portion of TPG and using that to verify TPG. The system may provide at least two paths to access the set of data encryption keys and a degree of redundancy may be provided between the administrator and the key controller. The system may furthermore alleviate the risk of customers locking themselves out of their data. No additional keys apart from service passwords may need to be managed by the customer. The end-users may not need to, or have to manage keys when using the system. The owner of the data (customer) may have control over the encryption keys, whereas the vendor or service provider may be responsible for key-encryption-key and other safety features. The key controller may manage and/or distribute keys automatically and/or may not require manual intervention (by admins or by users) for key management features. The only component of the system that may have access to data encryption keys in isolation may be the user application (and/or the user app via the key controller).

Figure 15:
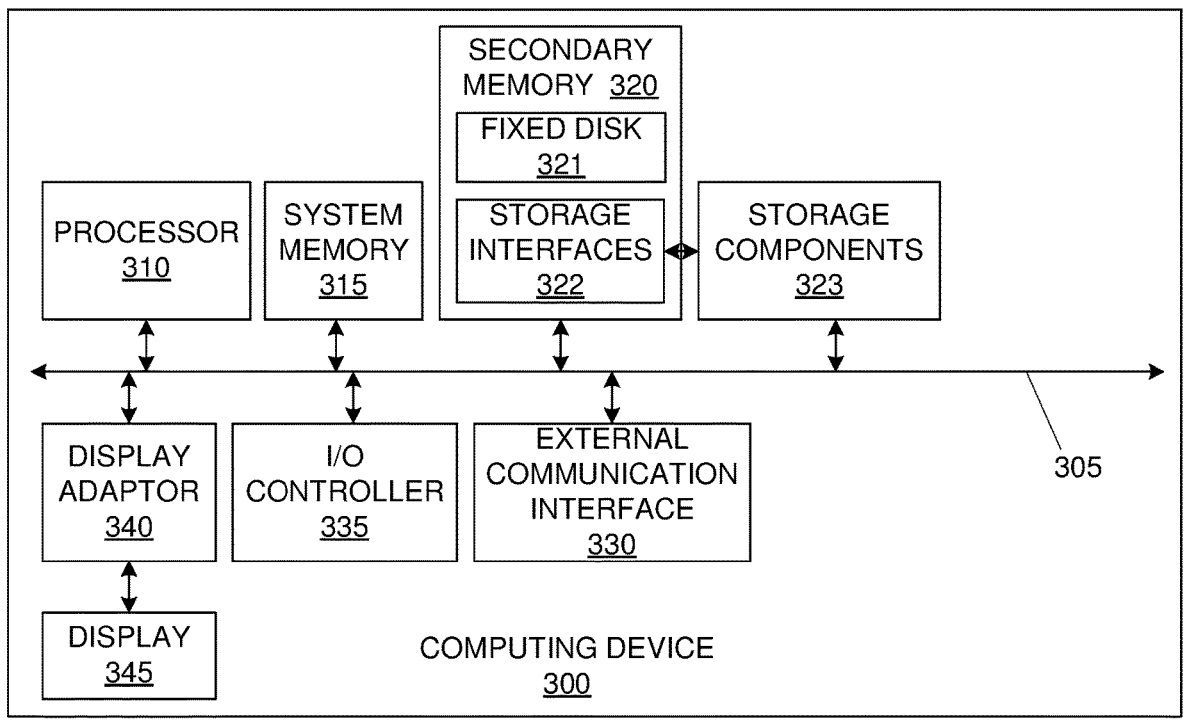
FIG. 15 illustrates an example of a computing device in which various aspects of the disclosure may be implemented.

FIG. 15 illustrates an example of a computing device (300) in which various aspects of the disclosure may be implemented. The computing device (300) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (300) may be suitable for storing and executing computer program code. The various participants and elements in the previously described system diagrams may use any suitable number of subsystems or components of the computing device (300) to facilitate the functions described herein. The computing device (300) may include subsystems or components interconnected via a communication infrastructure (305) (for example, a communications bus, a network, etc.). The computing device (300) may include one or more processors (310) and at least one memory component in the form of computer-readable media. The one or more processors (310) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (300) may be distributed over a number of physical locations (e.g. in a distributed, cluster or cloud-based computing configuration) and appropriate software units may be arranged to manage and/or process data on behalf of remote devices.

The memory components may include system memory (315), which may include read only memory (ROM) and random access memory (RAM). A basic input/output system (BIOS) may be stored in ROM. System software may be stored in the system memory (315) including operating system software. The memory components may also include secondary memory (320). The secondary memory (320) may include a fixed disk (321), such as a hard disk drive, and, optionally, one or more storage interfaces (322) for interfacing with storage components (323), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (300) may include an external communications interface (330) for operation of the computing device (300) in a networked environment enabling transfer of data between multiple computing devices (300) and/or the Internet. Data transferred via the external communications interface (330) may be in the form of signals, which may be electronic, electromagnetic, optical, radio, or other types of signal. The external communications interface (330) may enable communication of data between the computing device (300) and other computing devices including servers and external storage facilities. Web services may be accessible by and/or from the computing device (300) via the communications interface (330).

The external communications interface (330) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (310). A computer program product may be provided by a non-transient computer-readable medium, or may be provided via a signal or other transient means via the communications interface (330).

Interconnection via the communication infrastructure (305) allows the one or more processors (310) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (300) either directly or via an I/O controller (335). One or more displays (345) (which may be touch-sensitive displays) may be coupled to or integrally formed with the computing device (300) via a display (345) or video adapter (340).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A data protection system comprising:
an administrator computing device that is managed by an administrator and connected to a customer network;
a backend server having a processor and a memory for providing a secure data storage facility to the customer network; and
at least one key controller hosted on the customer network; wherein
the administrator computing device, the key controller, and the backend server use a hierarchy of cryptographic keys to cryptographically protect data of the customer network, the hierarchy of keys being distributed between the administrator computing device, the key controller and the backend server and comprising a plurality of encryption layers that are applied to encrypt the data of the customer network, the hierarchy of keys comprising a first master key that is derived from a password selected by the administrator and a second master key that is associated with the key controller and one or more derived keys that are derived from the first and second master keys, wherein at least one of the first and second master keys are kept resident only on the customer network and at least one of the derived keys are kept resident on the backend server, thereby inhibiting the backend server from obtaining access to plaintext data and master keys of the customer network, wherein the first master key is generated by the administrator computing device based on the password selected by the administrator and the second master key is generated by the at least one key controller, and wherein the first and second master keys provide two paths through the hierarchy of keys in order to facilitate the customer network to have redundancy of access to the first and second master keys.

2. The data protection system as claimed in claim 1, wherein the secure data storage facility is in the form of a remote database, and wherein the encrypted data of the customer network is stored in the remote database of the backend server.

3. The data protection system as claimed in claim 1, wherein a local database is associated with the customer network, wherein the second master key is stored in the local database of the customer network.

4. The data protection system as claimed in claim 1, wherein the customer network is provided with exclusive access to the second master key in plaintext form.

5. The data protection system as claimed in claim 1, wherein the first and second master keys are generated on the computing device of the administrator of the network.

6. The data protection system as claimed in claim 1, wherein the second master key is non-ephemeral.

7. The data protection system as claimed in claim 2, wherein a plurality of user domains are provided on the customer network, and wherein a plurality of user applications of a plurality of users are provided in communication with the key controller to enable the users to view plaintext data from the remote database by decrypting the data using at least one of the first and second master keys.

8. The data protection system as claimed in claim 1, wherein the first and second master keys provide multi-factor protection such that if one of the first and second master keys is lost the system is capable of rebuilding the hierarchy of keys using the other of the first and second master keys.

9. The data protection system as claimed in claim 1, wherein the key controller provides a gatekeeper functionality whereby the key controller automatically manages encryption and decryption of data.

10. A computer-implemented method for protecting data, the method comprising:

enabling a backend server to provide a secure data storage facility to a customer network that is managed by an administrator utilizing an administrator computing device connected to the customer network;

providing at least one key controller to be hosted on the customer network;

protecting data of the customer network with a hierarchy of cryptographic keys that are distributed between the administrator computing device, the key controller and the backend server and comprising a plurality of encryption layers that are applied to encrypt the data of the customer network, the hierarchy of keys comprising a first master key that is derived from a password selected by the administrator and a second master key that is associated with the key controller and one or more derived keys that are derived from the first and second master keys, wherein at least one of the first and second master keys are kept resident only on the customer network and at least one of the derived keys are kept resident on the backend server, thereby inhibiting the backend server from obtaining access to plaintext data and master keys of the customer network;

generating the first master key by the administrator computing device based on the password selected by the administrator and generating the second master key by the key controller; and providing two paths through the hierarchy of keys by way of the first and second master keys in order to facilitate the customer network to have redundancy of access to the first and second master keys.

11. The method as claimed in claim 10, wherein the secure data storage facility is in the form of a remote database, and wherein the method includes the step of storing encrypted data of the customer network in the remote database.

12. The method as claimed in claim 10, wherein a local database is associated with the customer network, and wherein the method includes storing the second master key in the local database of the customer network.

13. The method as claimed in claim 10, wherein the method includes providing the customer network with exclusive access to the second master key in plaintext form.

14. The method as claimed in claim 10, wherein the method includes generating the first and second master keys on the computing device of the administrator of the network.

15. The method as claimed in claim 10, wherein the second master key is non-ephemeral.

16. A computer program product for protecting data, the computer program product comprising a non-transitory computer-readable medium having stored computer-readable program code for performing the steps of:

enabling a backend server to provide a secure data storage facility to a customer network that is managed by an administrator utilizing an administrator computing device connected to the customer network;

providing at least one key controller to be hosted on the customer network;

protecting data of the customer network with a hierarchy of cryptographic keys that are distributed between the administrator computing device, the key controller and the backend server and comprising a plurality of encryption layers that are applied to encrypt the data of the customer network, the hierarchy of keys comprising a first master key that is derived from a password selected by the administrator and a second master key that is associated with the key controller and one or more derived keys that are derived from the first and second master keys, wherein at least one of the first and second master keys are kept resident only on the customer network and at least one of the derived keys are kept resident on the backend server, thereby inhibiting the backend server from obtaining access to plaintext data and master keys of the customer network;

generating the first master key by the administrator computing device based on the password selected by the administrator and generating the second master key by the key controller; and providing two paths through the key hierarchy by way of the first and second master keys in order to facilitate the customer network to have redundancy of access to the first and second master keys.

* * * * *